United States Patent [19]

Badesha et al.

[11] Patent Number: 4,917,980
[45] Date of Patent: Apr. 17, 1990

[54] PHOTORESPONSIVE IMAGING MEMBERS WITH HOLE TRANSPORTING POLYSILYLENE CERAMERS

[75] Inventors: Santokh S. Badesha, Pittsford; Milan Stolka, Fairport; Richard L. Schank, Pittsford, all of N.Y.

[73] Assignee: Xerox Corporation, Stamford, Conn.

[21] Appl. No.: 288,197

[22] Filed: Dec. 22, 1988

[51] Int. Cl.$^4$ ................................................ G03G 5/14
[52] U.S. Cl. ...................................... 430/58; 430/66; 430/126
[58] Field of Search ...................... 430/57, 58, 66, 126

[56] References Cited

U.S. PATENT DOCUMENTS

| | | | |
|---|---|---|---|
| 4,278,746 | 7/1981 | Goto et al. | 430/59 |
| 4,281,054 | 7/1981 | Horgan et al. | 430/59 |
| 4,356,246 | 10/1982 | Tabei et al. | 430/136 |
| 4,429,029 | 1/1984 | Hoffmann et al. | 430/57 |
| 4,544,729 | 10/1985 | Nate et al. | 528/28 |
| 4,556,622 | 12/1985 | Neumann et al. | 430/58 |
| 4,567,125 | 1/1986 | Moroni | 430/58 |
| 4,618,551 | 10/1986 | Stolka et al. | 430/58 |
| 4,758,488 | 7/1988 | Johnson et al. | 430/88 |
| 4,772,525 | 9/1988 | Badesha et al. | 430/58 |
| 4,774,159 | 9/1988 | Stolka et al. | 430/58 |

Primary Examiner—John L. Goodrow
Attorney, Agent, or Firm—E. O. Palazzo

[57] ABSTRACT

A charge transporting polysilylene-ceramer for use in layered imaging members comprised of

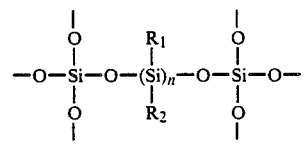

wherein $R_1$ and $R_2$ are independently selected from the group consisting of alkyl, aryl, substituted alkyl, substituted aryl, and alkoxy; and n represents the number of repeating units.

34 Claims, 1 Drawing Sheet

PHOTORESPONSIVE IMAGING MEMBERS WITH HOLE TRANSPORTING POLYSILYLENE CERAMERS

BACKGROUND OF THE INVENTION

This invention is generally directed to photoresponsive imaging members, and more specifically to polysilylene ceramers, which cermaers function as hole transporting substance, or may be selected as an overcoating for layered imaging members as illustrated, for example, in U.S. Pat. No. 4,265,990, the disclosure of which is totally incorporated herein by reference. More specifically, there is provided in accordance with the present invention layered photoresponsive imaging members comprised of a ceramer, reference *ACS Polymer Reprints* 26 (2), 300, (1985), the disclosure of which is totally incorporated herein by reference, and an organic polysilylene hole transporting layer; and a photogenerating layer. Moreover, there is provided in one particular aspect of the present invention an improved layered photoresponsive imaging member comprised of a supporting substrate, a photogenerating layer and in contact therewith a hole transport layer comprised of a polysilylene ceramer component, particularly wherein the polysilylene is poly(methylphenyl silylene), poly(m-propylmethyl silylene), and other similar silylenes. The aforesaid hole, or charge transport components can be prepared generally by the hydrolysis reaction of silanol terminated polysilylene oligomers, or preferably slaol terminated silanol groups containing polysilyenes with tetraalkoxy silane to provide polysilylene segments wherein n is a number, for example, equal to or greater than 10 as illustrated herein, crosslinked through $SiO_4$ units, which components are flexible and resistant to chemicals and physical abrasions such as scratching. The aforementioned polysilylene-ceramer component layer can be located as the top layer of the imaging member, or alternatively it may be situated between the supporting substrate, and the photogenerating layer. Moreover, the present invention is directed to the selection of the improved imaging members disclosed herein in electrophotographic, and especially xerographic imaging procesess inclusive of those wherein there is selected for development liquid ink compositions.

Additionally, there are provided in accordance with the present invention imaging members comprised of polysilylenes ceramers, which members contain thereover protective coatings primarily for the purpose of substantially eliminating or minimizing abrasion of the imaging member especially the photogenerating layer, which abrasion adversely effects image quality for example. Overcoatings generally in a thickness of, for example, from about 0.1 to about 2 microns that can be selected include those as illustrated, for example, in U.S. Pat. Nos. 4,565,760 and 4,595,602, the disclosures of which are totally incorporated herein by reference, polyesters, polyurethanes, and the like.

Numerous photoresponsive imaging members are known, inclusive of those wherein there are selected polysilylenes as hole transporting components, reference U.S. Pat. No. 4,618,551, the disclosure of which is totally incorporated herein by reference. More specifically, there is illustrated in the aforementioned patent a photoresponsive imaging member comprised of a supporting substrate, a photogenerating layer, and as a hole transport layer a polysilylene compound of the formula, for example, as recited in claim 1 wherein the substituents $R_1$, $R_2$, $R_3$, $R_4$, $R_5$, and $R_6$ are independently selected from a group consisting of alkyl, aryl, substituted alkyl, substituted aryl and alkoxy, and n, m and p numbers that represent the percentage of the monomer unit and the total polymer compound. Furthermore, the selection of silicone resin overcoatings for the aforementioned members is illustrated in column 12 of this patent.

In addition, ceramers are known, reference for example *American Chemical Society Polymer Prints* 26, (2), page 300, (1985) Wilkesorle and Haune. There is indicated in this publication, the disclosure of which is totally incorporated herein by reference, that ceramers are ceramic like materials which incorporate polymer-oligomeric components directly into the network thereof. Accordingly, the aforementioned hybrid material ceramer includes a glass component in an amount of 40 percent or more of the resulting material with the remainder being an oligomeric, or polymeric substance.

Also, there is disclosed in U.S. Pat. No. 4,544,729 a photosensitive polymer comprised of a combination of silyl and siloxy moieties; while U.S. Pat. No. 4,356,246 discloses electrophotographic amorphous silicon materials wherein there can be physically combined a polysilane with a silicone resin, reference columns 2 and 8. The incorporation of other active compounds to convert a silicone resin film to a transport layer is illustrated in U.S. Pat. Nos. 4,278,746; 4,281,054; 4,429,029; 4,556,622 and 4,567,125.

Although the above described imaging members, particularly those disclosed in the aforementioned U.S. Pat. No. 4,618,551 and U.S. Pat. No. 4,265,660 are useful for their intended purposes, there is a need for improved imaging members. More specifically, there is a need for photoresponsive imaging members wherein undesirable charge traps are avoided and/or substantially eliminated thereby enabling members wherein unacceptably high residual potentials are avoided after photodischarge permitting images of excellent resolution with no background deposits for extended time periods. There is also a need for imaging members wherein there is selected polysilylene-ceramer components as the hole or charge transporting component, which materials are substantially inert to the users of these members. Further, there continues to be a need for improved photoresponsive imaging members which can be prepared with a minimum number of processing steps, and wherein the layers are sufficiently adhered to one another to permit the continuing use of these members in repetitive imaging processes. Also, there is a need for new hole transporting polysilylene ceramer compounds that are useful as protective overcoating layers and as in interface materials for various imaging members. Moreover, there continues to be a need for a specific layered imaging member which not only generates acceptable images but which can be repeatedly used in a number of imaging cycles without deterioration thereof in the machine environment or surrounding conditions while simultaneously preventing unacceptable high residual potentials to generate after photodischarge, and thereby adversely affecting image resolution. Likewise, there is a need for hole transporting compounds with increased stability, for example, wherein there is no extraction of these compounds from the layered imaging members in which they are incorporated when, for example, liquid developers are selected for rendering the latent electrostatic image visible. Furthermore, there is a need for hole transporting compounds useful in layered imaging members, which compounds are insulators in the dark compared to many other known hole transporting compounds thus enabling charging of the resulting imaging member to higher fields while maintaining cyclic stability and allowing improved developability. In addition, there is a need for enabling the preparation of imaging members with hole transporting compounds wherein the preparation sequence permits the selection of a variety of solvents inclusive of toluene, benzene, tetrahydrofuran, cyclohexane and halogenated solvents in addition to methylene chloride. Another need of the present invention resides in abrasion resistant imaging members that maintain their flexibility for extended time periods, and that retain their electrical properties for a substantially unlimited number of imaging cycles. There is also a need for layered imaging members wherein there is selected a protective overcoating, especially when the charge transport layer is situated between a supporting substrate and a photogenerating layer.

SUMMARY OF THE INVENTION

It is an object of the present invention to provide improved photoresponsive imaging members with hole transporting components.

It is yet another object of the present invention to provide layered imaging members containing therein polysilylene-ceramer hole, or charge transporting complex substances.

In a further object of the present invention there are provided improved layered photoresponsive imaging members with the photogenerating layer situated between a supporting substrate and a hole transport layer comprised of a polysilylene-ceramer component.

Moreover, in yet another object of the present invention there are provided improved photoresponsive imaging members comprised of polysilylene-ceramer components functioning as hole transports which can be situated between a supporting substrate and a photogenerating layer.

In still yet another object of the present invention there are provided improved photoresponsive imaging members comprised of hole transporting compounds of polysilylene-ceramers, photogenerating pigments, and protective overcoating layers.

Furthermore, in another object of the present invention there are provided layered in photoresonsive imaging members wherein unacceptable high residual potentials are avoided after photodischarge thereby enabling images of excellent resolution with no background deposits beginning with the first imaging cycle, and continuing on to an extended number of imaging cycles exceeding, for example, 100,000.

Another further object of the present invention resides in the provision of layered imaging members comprises of hole transporting polysilylene-ceramers as charge transportcomponents with improved stability, thus undesirably avoiding extraction of the hole transport compound with, for example, liquid developer compositions.

Further, another object of the present invention resides in the provision of layered imaging members comprised of hole transporting polysilylene-ceramers as charge transport components, and wherein these members are abrasion resistant and maintain their flexibility for an extended number of imaging cycles.

Also, another object of the present invention resides in the provision of layered imaging members comprised of hole transporting polysilylene-ceramers charge transport components, and wherein the electrical characteristics of the member is retained for an extended number of imaging cycles.

In yet another object of the present invention there are provided imaging members with a protective overcoating thereover of the polysilylene-ceramers disclosed herein.

Furthermore, in another object of the present invention there are provided imaging and printing methods with the improved imaging members illustrated herein.

These and other objects of the present invention are accomplished by the provision of charge, or hole transporting compositions comprised of certain ceramers. More specifically, the present invention is directed to an improved photoresponsive imaging member comprised of a photogenerating layer and a charge transporting layer comprised of polysilylene-ceramer components.

In one specific embodiment, the present invention is directed to an improved photoresponsive imaging member comprised of a supporting substrate, a photogenerating layer comprised of inorganic or organic photoconductive pigments optionally dispersed in an inactive resinous binder, and in contact therewith a charge transport layer comprised of a ceramer of the formulas illustrated herein, which ceramer contains a silica network and polysilylenes. Another specific photoresponsive imaging member of the present invention is comprised of the polysilylene-ceramer hole transporting layer situated between a supporting substrate and a photogenerating layer.

With further respect to the hole transporting layers of the imaging members of the present invention, they can be formulated from polysilylenes such as those illustrated in U.S. Pat. No. 4,618,551, the disclosure of which is totally incorporated herein by reference. More specifically, the polysilylenes illustrated in the '551 patent include generally polymers especially homopolymers, copolymers or terpolymers of the following formula

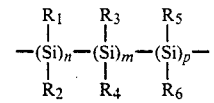

wherein $R_1$, $R_2$, $R_3$, $R_4$, $R_5$ and $R_6$ are independently selected from the group consisting of alkyl aryl, substituted alkyl, substituted aryl, and alkoxy; and n, m and p are numbers that represent the percentage of the monomer unit in the total polymer composition with the sum of n plus m plus p being equal to 100 percent. Specifically thus, for example, zero percent is less than, or equal to n, and n is less than or equal to 100 percent; and zero percent is less than, or equal to p, and p is less than, or equal to 100 percent. Any of the monomer units of the polysilylene can be randomly distributed throughout the polymer, or may alternatively be in blocks of varying lengths.

As preferred polysilylene compounds illustrated in the '551 patent there is mentioned poly(methylphenyl silylene) of the following formula

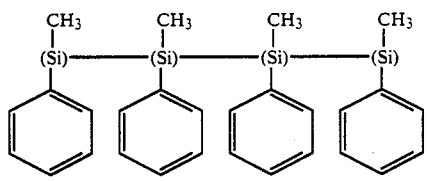

which silylene has a weight average molecular weight of in excess of 50,000 and preferably is of a weight average molecular weight of from about 75,000 to about 1,000,000. Similarly, the polysilylenes of the general formula illustrated hereinbefore ae of a weight average molecular weight of in excess of 50,000 and preferably are of a weight average molecular weight of from about 75,000 to about 2,000,000, and preferably of from about 300,000 to about 800,000.

Examples of alkyl groups include those that are linear, or branches of from one carbon atom to about 24 carbon atoms, and preferably from about 1 carbon atom to about 8 carbon atoms, inclusive of methyl, ethyl, propyl, butyl, amyl, hexyl, octyl, nonyl, decyl, pentadecyl, stearyl; and unsaturated alkyls inclusive of allyls, and other similar substituents. Specific preferred alkyl groups are methyl, ethyl, propyl and butyl. Aryl substituents are those of from 6 carbon atoms to about 24 carbon atoms, inclusive of phenyl, naphthyl, anthryl, and the like. These alkyl and aryl groups may be substituted with alkyl, aryl, halogen, nitro, amino, alkoxy, cyano, and other related substituents. Examples of alkoxy groups include those with from 1 carbon atoms to about 10 carbon atoms, such as methoxy, ethoxy, propoxy, butoxy, and other similar substitutents.

The preferred charge transporting ceramer of the present invention is comprised of a ceramer containing silica network and polysilylene components. The aforementioned ceramer can be illustrated with reference to the following formula wherein the free covalent bonds represent a growing inorganic network where the bonds would be attached to another silicon atom with three oxygen atoms attached thereto and a further covalent bond:

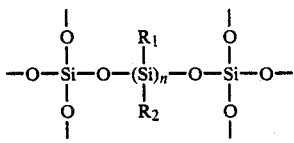

(A)

wherein $R_1$ and $R_2$ are independently selected from the group consisting of alkyl, aryl, substituted alkyl, substituted aryl, and alkoxy; and n represents the number of repeating units present. Thus, for example, n can be a number of from about 10 to about 100, and preferably from about 10 to about 50. The alkyl and aryl substituents are as illustrated herein, that is alkyl includes linear or branched hydrocarbon with from 1 to about 24 carbon atoms such as methyl, ethyl, propyl, butyl and the like, while aryl includes aromatic hydrocarbons containing from about 6 to about 24 carbon atoms such as phenyl, napthyl, anthryl and the like. Similarly, alkoxy substituents include those with from about 1 to about 10 carbon atoms such as methoxy, ethoxy, propoxy, butoxy and other similar substituents. Substituted includes but is not limited to alkyl, aryl, nitro, halogen, and the like.

The polysilylene ceramers of the present invention can be prepared by a number of different methods including, for example, the reaction of a silicone oxide network component such as tetraethoxyorthosilicate-Si(OC$_2$H$_5$)$_4$ with a polysilylene as illustrated herein, which polysilylenes preferably contain terminal groups such as hydroxy, alkoxy, 1 to about 25, and preferably 1 to about 10 carbon atoms, and the like. Generally, there is initially prepared the (1) silica network, reference Formula A as illustrated herein, from the hydrolysis and condensation reaction of silicon alkoxides, Si(OR)$_4$, wherein R is alkoxy, such as a tetraalkoxyorthosilicate, which alkoxide has been dissolved in a suitable solvent such as tetrahydrofuran, toluene, alcohols, including methanol, halogenated aliphatic slvents such as trichloroethylene, mixtures thereof, and the like; and wherein, for example, from about 5 to about 50 and preferably from about 20 to about 30 weight percent of solvents are selected. This known reaction for the formation of the aforesaid silica network (gel) is illustrated, for example, in the textbook *Ultra Structure Processing of Ceramic Glasses and Composites,* Larry Hench and Donald Ulrich, published by John Wiley and Sons, 1984, the disclosure of which is totally incorporated herein by reference. There is then prepared the source (2) for the (Si)$_n$-R$_1$-R$_2$ reference Formula A illustrated herein by dissolving an appropriate terminated polysilylene, see U.S. Pat. No. 4,618,551, the disclosure of which is totally incorporated herein by reference in the aforementioned solvents, which solvent is present, for example, in an amount of from about 5 to about 50 and preferably from about 10 to about 15 percent by weight. The polysilylene can be terminated with, for example, hydroxy, alkoxy, including methoxy, propoxy, ethoxy, butoxy, pentoxy, and the like, halide, such as chloride, bromide, fluoride, iodide, and the like. Other solvents, and amounts thereof not specifically mentioned herein can be selected providing the objectives of the present invention are achievable. Subsequently, the aforementioned resulting products (1) and (2) are mixed together, an acid catalyst is added to the mixture, and refluxing is accomplished for an appropriate amount of time, preferably from about 1 to about 3 hours. There results a semigel of, for example, Formula A illustrated herein. Examples of cid catalysts include nitric acid, sulfuric acid, hydrochloric acid, acetic acid, and the like, which catalyst can be selected in various effective amounts depending, for example, onthe other reactants utilized. Usually from about 0.1 to about 5 and preferably about 0.1 percent by weight of catalyst is selected. Also, from about 50 to 90, and preferably from about 70 to 80 weight percent of (1), and from about 10 to about 50 and preferably from about 20 to about 30 weight percent of (2) are mixed, however, other amounts can be selected providing the objectives of the present invention are achieved. Similar catalysts in about the same amounts are selected for the hydrolysis reaction (1). In addition, other networks can be selected, such as metal oxide networks, in place of the silica networks wherein the oxides include, for example, zirconium oxides, tin oxides, indium oxides, aluminum oxides, yterium oxides, barium oxides, lead oxides, mixtures thereof, and the like. It is believed that with the aforementioned reactions there is covalently bonded the terminated polysilylene to the growing silica, or metal oxide network; thus, for example, incorporating the polysilylene therein. Further, the polysilylene can be dispersed into the pores of the silica network, or metal oxide network.

Thereafter, the resulting semigel in one embodiment of the present invention can be formed into a thin film by known methods such as vacuum evaporation, or applied to the supporting substrate, or a photogenerating layer present in the imaging members illustrated herein.

The improved photoresponsive imaging members of the present invention can be prepared by a number of known methods, the process parameters, and the order of the coating of the layers being dependent on the member desired. Thus, for example, the improved photoresponsive members of the present invention can be prepared by providing a conductive substrate with an optional hole blocking layer and optional adhesive layer; and applying thereto by solvent coating processes laminating processes, or other methods, a photogenerating layer and the polysilylene-ceramer mixture hole transport layer. Other methods include melt extrusion, dip coating, and spraying.

BRIEF DESCRIPTION OF THE DRAWINGS

For a better understanding of the present invention and further features thereof, reference is made to the following detailed description of various embodiments wherein:

FIG. 2 represents a partially schematic cross-sectional view of a photoresponsive imaging member of the present invention; and.

DESCRIPTION OF THE PREFERRED EMBODIMENTS

Figure 1:
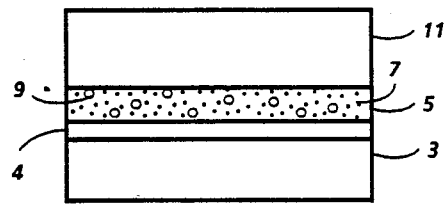
FIG. 1 is a partially schematic cross-sectional view of a photoresponsive imaging member of the present invention.

Illustrated in FIG. 1 is a negatively charged improved photoresponsive imaging member of the present invention comprised of a supporting substrate 3, an optionally adhesive blocking layer 4, a charge carrier photogenerating layer 5 comprised of a photogenerating pigment 7 optionally dispersed in an inactive resinous binder composition 9, and a hole transport layer 11 compised of a polysilylene-ceramer component illustrated herein. In an alternative embodiment of the present invention, and with further regard to FIG. 1, the hole transporting layer can be situated between the supporting substrate and the photogenerating layer resulting in a positively charged imaging member.

Figure 2:
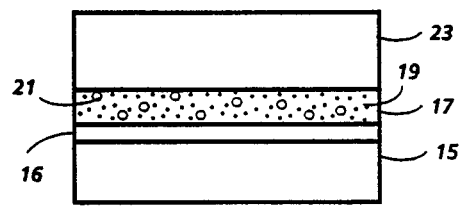

Illustrated in FIG. 2 is a negatively charged photoresponsive imaging member of the present invention comprised of a conductive supporting substrate 15 of aluminized Mylar, an optional adhesive blocking layer 16, a photogenerating layer 17 comprised of trigonal selenium, photogenerating pigment 19, or other similar inorganic pigments as well as organic pigments dispersed in a resinous binder 21, and a hole transport layer 23 comprised of the polysilylene ceramer film of Example III.

Figure 3:
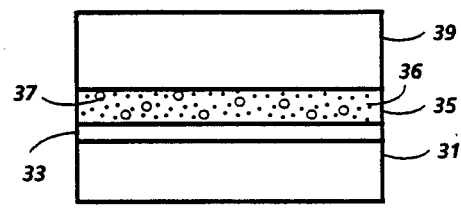
FIG. 3 represents a partially schematic cross-sectional view of the photoresponsive imaging member of the present invention including therein an optional/blocking adhesive layer.

Illustrated in FIG. 3 is a photoresponsive imaging member of the present invention comprised of a conductive supporting substrate 31 of aluminized Mylar, an optional adhesive blocking layer 33, a photogenerating layer 35 comprised of an inorganic or organic photogenerating pigment 36 inclusive of trigonal selenium, metal phthalocyanines, metal free phthalocyanines, vanadyl phthalocyanines, cadmium-sulfur-selenide, dispersed in a resinous binder 37, and a charge, or hole transport layer 39 comprised of the polysilylene ceramer film of Example III.

Additionally, the present invention is directed to imaging members as illustrated, for example, in U.S. Pat. No. 4,265,990, the disclosure of which is totally incorporated herein by reference, and wherein as a charge transport there are selected aryl amines; and as a protective overcoating in a thickness of, for example, from about 0.1 to about 5 microns, a polysilyleneceramer as illustrated herein. Moreover, the imaging members of the present invention with the polysilyleneceramer illustrated herein at a charge transporting component can contain as protective overcoatings, preferably of a thickness of from about 0.1 to about 1.5 microns those illustrated herein including those as illustrated in U.S. Pat. Nos. 4,565,760 and 4,595,602, the disclosures of which are totally incorporated herein by reference. Examples of these overcoatings include crosslinkable organosiloxane silica hybrid materials.

The supporting substrate layers may be opaque or substantially transparent, and may comprise any suitable material having the requisite mechanical properties. Thus, these substrates may comprise a layer of nonconducting material such as an inorganic or organic polymeric material, a layer of an organic or inorganic material having a conductive surface layer arranged thereon or a conductive material such as, for example, aluminum, chromium, nickel, indium, tin oxide, brass or the like. The substrate may be flexible or rigid and may have any of many different configurations such as, for example, a plate, a cylindrical drum, a scroll, an endless flexible belt, and the like. Preferably, the substrate is in the form of an endless flexible belt.

The thickness of the substrate layer depends on many factors, including economical considerations. Thus, this layer may be of substantial thickness, for example over 100 mils, or minimum thickness providing there are no adverse effects on the system. In one preferred embodiment, the thickness of this layer ranges from about 3 mils to about 10 mils.

Examples of the photogenerating pigments are as illustrated herein, including inorganic and organic components such as amorphous selenium, selenium alloys, such as $As_2Se_3$, trigonal selenium, metal free phthalocyanines, metal phthalocyanines, vanadyl phthalocyanines, squaraines, perylenes, and the like, with $As_2Se_3$ being preferred. Also useful as photogenerators are hydrogenated amorphous silicon, germanium, and silicon-germanium alloys. Typically, this layer is of a thickness of from about 0.3 micron to about 10 microns depending on the photoconductive volume loading, which may vary from 5 to 100 volume percent, this layer can be of other thickness, and is preferably from about 0.3 micron to about 3 microns in thickness. Generally, it is desirable to provide this layer in a thickness which is sufficient to absorb about 90 percent or more of the incident radiation which is directed upon it in the imagewise exposure step. The maximum thickness of this layer is dependent primarily upon facts such as mechanical considerations, for example, whether a flexible photoresponsive imaging member is desired.

Optional resin binders for the photogenerating pigments, and the charge transport polysilylene ceramer layer are, for example, the polymers as illustrated in U.S. Pat. No. 3,121,006, the disclosure of which is totally incorporated herein by reference, polyesters, polyvinyl butyrals, polyvinyl carbazoles, polycarbonate resins, epoxy resins, polyhyroxyether resins, and the like. The charge transport layer generally contains from about 30 to about 70 weight percent of polymer binder.

Hole blocking layer component examples with, for example, a thickness of from about 0.1 to about 1 micron include metal oxides, metal halides, and the like, such as titanium oxide, aluminum oxide, copper iodide, gamma-APS TM a commercially available organo silane, and the like. Examples of adhesive layer components with, for example, a thickness of from about 0.1 to about 1 micron include polyesters, such as 49,000 polyester available from Goodyear Chemical Company, and the like.

The imaging members of the present invention are useful in various electrophotographic printing and imaging systems, especially xerographic processes, wherein an electrostatic image is formed on the photoresponsive imaging member, followed by the development thereof, with known toner and developer compositions reference for example U.S. Pat. Nos. 4,338,390; 4,298,672 and 4,560,635, the disclosures of which are totally incorporated herein by reference; transfer to a suitable substrate, and fixing of the resultant image.

The invention will now be described in detail with respect to specific preferred embodiments thereof, it being understood that these examples are intended to be illustrative only, the invention is not intended to be limited to the materials, conditions, process parameters, etc. recited herein. All parts and percentages are by weight unless otherwise indicated.

EXAMPLE I

This example described the preparation of polysilylene unit $(Si)_n$-$R_1$-$R_2$, wherein $R_1$ is phenyl, $R_2$ is methyl, and n is a number of from about 40 to about 60, which unit was selected for the preparation of the desired ceramer product.

There was prepared a polysilylene by initially adding to a reaction flask 4.6 grams (0.2 moles) of sodium metal and 100 milliliters of toluene. The contents of the flask were heated and stirred vigorously under argon atmosphere, about 15 minutes, at which time the sodium is finely dispersed. Dichlorophenylmethylsilane (15 milliliters, 0.1 mole) was then added dropwise to the reaction mixture through an addition funnel over a period of 10 minutes. The reaction was exothermic, thus the rate of addition is important. After the completion of the addition, the contents of the flask were heated and stirred further for three hours. The resulting dark blue slurry was cooled to room temperature, and filtered under argon. Thereafter, the resulting filtered precipitate was washed three times with 25 milliliter portions of dry toluene. The filtrate and the washings were then combined. The precipitate, which is a mixture of sodium salts, was discarded. The above filtrate was then poured dropwise into 1 liter of stirring methanol. The white precipitate, which was polyphenylmethylsilane, 5.3 grams, was collected by filtration. GPC analysis indicated this polymer to be bimodal and primarily having a molecular weight fraction of 5,000 to 7,000, wherein n is a number of from about 40 to about 60. The other fraction, which was approximately 10 percent, had a molecular weight of approximately 60,000.

EXAMPLE II

This example describes a method for the preparation of a ceramer.

Tetraethoxyorthosilicate (30 grams) and the polyphenylmethylsilane (5 grams) obtained from Example I were added to a round bottom flask equped with a refluxing condenser. Tetrahydrofuran (100 milliliters) was then added to the flask and the contents of the flask was stirred until a clear solution results, about 10 minutes. Hydrochloric acid (5 milliliters) was added dropwise over a period of 2 minutes and the reaction mixture was then fluxed for 1 hour, followed by cooling. There results the polysilylene ceramer semigel of Formula A illustrated herein wherein $R_1$ is phenyl, $R_2$ is methyl, and n is 50.

EXAMPLE III

This example describes the formation of a charge transporting clear flexible thin film.

Ten (10) milliliter portions of the polysilylene ceramer semigel obtained from Example II was poured into a glass petri dish with a 4 inch diameter. The petri dish was then covered to ensure slow evaporation of the tetrahydrofuran solvent. After drying for 24 hours a clear, free standing and flexible film was obtained. The clarity of the film indicates that there was no phase separation.

EXAMPLE IV

There was prepared a layered photoresponsive imaging member by providing an aluminized Mylar substrate in a thickness of 3 mils, followed by applying thereto with a multiple clearance film applicator in a wet thickness of 0.5 mil, a blocking layer of 3-aminopropyl triethoxysilane, available from PCR Research Chemicals of Florida, in ethanol in a 1:50 volume ratio. This layer was then allowed to dry for 5 minutes at room temperature, followed by curing for 10 minutes at 110° C. in a forced air oven. A photogenerating layer of amorphous selenium in a thickness of 0.4 micron was then applied to the silane layer. Thereafter, the amorphous selenium photogenerating layer was overcoated by draw bar coating with a charge transport layer of the poly(methylphenyl silylene)-ceramer semigel component obtained by the process of Example II. There resulted after drying a charge transport layer of 10 microns in thickness. When the above prepared imaging member is incorporated into a xerographic imaging test fixture, it is believed that images of excellent resolution with no background deposits can be obtained subsequent to development with a toner comprised of 90 percent of styrene n-butyl methacrylate (58/42), 8 percent of carbon black, and 2 percent of cetyl pyridinium chloride. More specifically, electrostatic latent images can be generated on the above prepared imaging member subsequent to its incorporation into a xerographic imaging test fixture, and after charging the member to a negative voltage of 800 volts. Thereafter, the resulting images are developed with a toner composition comprised of 92 percent by weight of a styrene n-butylmethacrylate copolymer (58/42), 8 percent by weight of carbon black particles, and 2 percent by weight of the charge enhancing additive cetyl pyridinium chloride. There will result, it is believed as determined by visual observation, developed images of excellent resolution and superior quality for 75,000 imaging cycles. Further, it is believed that the polysilylene ceramer charge transport layer will retain its insulating characteristics in the dark as can be evidenced, for example, by measurements of the initial decay of voltage of the photoreceptor, as measured with an electrometer, 25 volts per second at the beginning and at the end of this test, that is about 25,000 imaging cycles. This enables, it is believed, the imaging member to be charged to higher fields while at the same time maintaining the cyclic stability of the member, and providing for improved developability for the images generated.

The imaging member can, it is believed, be charged to a −700 volts by a corona, which charge can be measured with an electrometer immediately after charging, about 0.2 second. In 60 seconds, the potential on the member will, it is believed, be dropped to −575 volts, equivalent to a more than acceptable dark decay of about 25 volts per minute. Also, most of this potential drop should occur within the first 2 to 3 seconds. The charging sequence can be repeated, it is believed, with the exception that the imaging member is initially charged to a potential of −1,000 volts, and the initial dark decay is about 20 volts per second.

EXAMPLE V

A photoresponsive imaging member can be prepared by repeating the procedure of Example IV with the exception that there is selected as the photogenerating layer an alloy of selenium arsenic with 99.7 percent selenium, and wherein the thickness of this layer is 0.2 micron, which layer is applied by vacuum deposition, and it is believed that substantially similar imaging results can be obtained.

EXAMPLE VI

An imaging member can be prepared by repeating the procedure of Example IV with the exceptin that there is selected as the photogenerating layer vanadyl phthalocyanine, which layer has a thickness of about 0.1 micron, and was obtained by vacuum deposition. It is believed that substantially similar imaging results can be obtained.

The above mentioned imaging members, especially when the charge transport layer is situated between the supporting substrate and the photogenerating layer, can also be overcoated with crosslinkable siloxanol colloidal silica hybrid materials, available from Dow Corning Company, containing no ionic contamination, and having an acid number of less than about 1, reference U.S. Pat. No. 4,565,760, the disclosure of which is totally incorporated herein by reference. This crosslinkable organosiloxane silica hybrid material solution selected contains 4 percent by weight of the crosslinkable organosiloxane silica hybrid material dissolved in isopropanol-isobutyl alcohol and 10 percent by weight of hydroxy functionalized polymethylphenyl silylene hole transport polymer. It is believed that this imaging member would be further resistant to abrasions and resistant to environmental contaminations.

Although the invention has been described with reference to specific preferred embodiments, it is not intended to be limited thereto, rather those skilled in the art will recognize that variations and modifications may be made therein which are within the spirit of the invention, and within the scope of the following claims.

What is claimed is:

1. A charge transporting polysilylene-ceramer in a layered imaging member comprised of

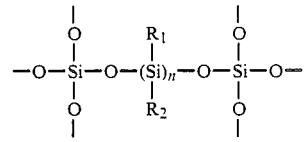

wherein $R_1$ and $R_2$ are independently selected from the group consisting of alkyl, aryl, substituted alkyl, substituted aryl, and alkoxy; and n represents the number of repeating units.

2. A transporting compound in accordance with claim 1 wherein alkyl contains from 1 to about 25 carbon atoms.

3. A transporting compound in accordance with claim 1 wherein aryl conains from 6 to about 24 carbon atoms.

4. A transporting compound in accordance with claim 1 wherein n is a number of from about 10 to about 100.

5. A transporting compound in accordance with claim 1 wherein n is a number of from about 10 to about 50.

6. A layered imaging member comprised of a supporting substrate, a photogenerating layer, and as a charge transport layer the polysilylene-ceramer of claim 1.

7. An imaging member in accordance with claim 6 wherein n is a number of from about 10 to about 100.

8. An imaging member in accordance with claim 6 wherein the substrate is comprised of a conductive material or a polymer.

9. An imaging member in accordance with claim 6 wherein the photogenerating layer is comprised of inorganic photoconductive pigments, organic photoconductive pigments, or mixtures thereof.

10. An imaging member in accordance with claim 9 wherein the inorganic pigments are amorphous selenium, selenium alloys, or trigonal selenium.

11. An imaging member in accordance with claim 9 wherein the organic pigments are metal phthalocyanines, metal free phthalocyanines, or vanadyl phthalocyanine.

12. An imaging member in accordance with claim 6 containing a protective overcoating.

13. An imaging member in accordance with claim 7 containing a protective overcoating.

14. A process for generating electrostatic latent images which comprises providing the imaging member of claim 6, forming thereon an electrostatic latent image, thereafter accomplishing development of the image, subsequently transferring the developed image to a suitable substrate, and permanently affixing the image thereto.

15. A process in accordance with claim 14 wherein there are selected for development of the image liquid ink compositions.

16. A process in accordance with claim 14 wherein high residual potentials are not present on the imaging member after full discharge.

17. A process for generating developed electrostatic latent images which comprises providing the imaging member of claim 7, and forming thereon an electrostatic latent image, thereafter accomplishing development of the image, subsequently transferring the developed image to a suitable substrate, and permanently affixing the image thereto.

18. A process for generating developed electrostatic latent images which comprises providing the imaging member of claim 8, and forming thereon an electrostatic latent image, thereafter accomplishing development of the image, subsequently transferring the developed image to a suitable substrate, and permanently affixing the image thereto.

19. An imaging member in accordance with claim 6 wherein the ceramer is a hybrid component comprised of at least 40 percent of an inorganic glass component incorporated into a polymeric material.

20. A charge transporting ceramer in accordance with claim 1 wherein $R_1$ is phenyl and $R_2$ is methyl.

21. A charge transporting ceramer in accordance with claim 1 wherein $R_1$ is toluene and $R_2$ is methyl.

22. A charge transporting ceramer in accordance with claim 1 wherein $R_1$ and $R_2$ are methyl.

23. A charge transporting ceramer in accordance with claim 1 wherein $R_1$ is n-hexyl and $R_2$ is methyl.

24. An imaging member in accordance with claim 6 wherein the photogenerating layer is comprised of photogenerating pigments dispersed in a resin binder.

25. An imaging member in accordance with claim 6 wherein the charge transport ceramer is dispersed in a resin binder.

26. A layered imaging member comprised of a photogenerating layer, and as a hole transport layer the polysilylene-ceramer of claim 1.

27. An imaging member in accordance with claim 26 wherein for the ceramer n is a number of from about 10 to about 100.

28. An imaging member in accordance with claim 26 wherein for the ceramer n is a number of from about 10 to about 50.

29. An imaging member in accordance with claim 26 containing a protective overcoating.

30. An imaging member in accordance with claim 27 containing a protective overcoating.

31. An imaging member in accordance with claim 26 wherein $R_1$ is phenyl and $R_2$ is methyl for the polysilylene ceramer.

32. An imaging member in accordance with claim 26 wherein $R_1$ is phenyl, $R_2$ is methyl, and n is 50 for the polysilylene ceramer.

33. An imaging member in accordance with claim 6 wherein for the polysilylene ceramer $R_1$ is phenyl, $R_2$ is methyl, and n is a number of from about 40 to about 60.

34. An imaging member in accordance with claim 6 wherein for the polysilylene ceramer $R_1$ is phenyl, $R_2$ is methyl, and n is 50.

* * * * *